(12) United States Patent
Kamata

(10) Patent No.: US 11,467,596 B2
(45) Date of Patent: Oct. 11, 2022

(54) TARGET ABNORMALITY DETERMINATION DEVICE

(71) Applicant: TOYOTA JIDOSHA KABUSHIKI KAISHA, Toyota (JP)

(72) Inventor: Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 16/930,451

(22) Filed: Jul. 16, 2020

(65) Prior Publication Data

US 2020/0348682 A1 Nov. 5, 2020

Related U.S. Application Data

(63) Continuation of application No. 16/042,525, filed on Jul. 23, 2018, now Pat. No. 10,754,347.

(30) Foreign Application Priority Data

Sep. 8, 2017 (JP) .............................. JP2017-173023

(51) Int. Cl.
*G05D 1/02* (2020.01)
*B60W 30/08* (2012.01)
(Continued)

(52) U.S. Cl.
CPC ............. *G05D 1/0231* (2013.01); *B60Q 9/00* (2013.01); *B60W 30/08* (2013.01);
(Continued)

(58) Field of Classification Search
CPC .. G05D 1/0231; G05D 1/0223; G05D 1/0246; G05D 1/0274; G05D 2201/0213;
(Continued)

(56) References Cited

U.S. PATENT DOCUMENTS 8,718,861 B1 * 5/2014 Montemerlo ......... B60W 30/00
701/411
9,495,874 B1 11/2016 Zhu et al.
(Continued)

FOREIGN PATENT DOCUMENTS

JP 08-221699 A 8/1996
JP 11-083997 A 3/1999
(Continued)

*Primary Examiner* — Abby Y Lin
*Assistant Examiner* — Dylan M Katz
(74) *Attorney, Agent, or Firm* — Sughrue Mion, PLLC

(57) ABSTRACT

A vehicle control device includes a tracking unit estimating a motion of a moving object, a model selection unit selecting a motion model corresponding to a moving object type, an abnormality determination unit determining a presence or absence of an abnormality of the estimation of the motion of the moving object based on the estimated moving object motion and the motion indicated by the motion model, and a control unit. A control mode in which the control unit controls traveling of a host vehicle when the abnormality determination unit determines that the abnormality is present differs from a control mode in which the control unit controls the traveling of the host vehicle when the abnormality determination unit determines that the abnormality is absent.

1 Claim, 2 Drawing Sheets

(51) Int. Cl.
  *G06T 7/246* (2017.01)
  *G06T 7/73* (2017.01)
  B60Q 9/00 (2006.01)
  *G06T 7/277* (2017.01)
  *H04N 13/204* (2018.01)
  *G06T 7/00* (2017.01)

(52) U.S. Cl.
  CPC .......... G05D 1/0223 (2013.01); G05D 1/0246 (2013.01); G05D 1/0274 (2013.01); G06T 7/246 (2017.01); G06T 7/251 (2017.01); G06T 7/277 (2017.01); G06T 7/75 (2017.01); *G05D 2201/0213* (2013.01); *G06T 7/0016* (2013.01); *G06T 2207/30241* (2013.01); *G06T 2207/30261* (2013.01); *H04N 13/204* (2018.05)

(58) Field of Classification Search
  CPC .......... B60Q 9/00; B60Q 9/008; B60W 30/08; B60W 30/12; B60W 30/143; B60W 60/0018; B60W 2050/0215; G06T 7/246; G06T 7/251; G06T 7/277; G06T 7/75; G06T 2207/30241; G06T 2207/30261; H04N 13/204; G06V 20/58
  See application file for complete search history.

(56) References Cited

U.S. PATENT DOCUMENTS

| | | | |
|---|---|---|---|
| 2008/0084283 A1 | 4/2008 | Kalik | |
| 2009/0005959 A1 | 1/2009 | Bargman et al. | |
| 2010/0208063 A1* | 8/2010 | Lee | H04N 7/181 |
| | | | 382/103 |
| 2011/0313664 A1 | 12/2011 | Sakai et al. | |
| 2013/0197736 A1 | 8/2013 | Zhu et al. | |
| 2014/0043166 A1* | 2/2014 | Sasaki | G08G 1/166 |
| | | | 340/576 |
| 2014/0119608 A1 | 5/2014 | Lee et al. | |
| 2014/0203959 A1* | 7/2014 | Kriel | G06K 9/62 |
| | | | 342/52 |
| 2015/0016681 A1 | 1/2015 | Fukata et al. | |
| 2015/0169979 A1 | 6/2015 | Ko et al. | |
| 2015/0261218 A1* | 9/2015 | Nakamura | G05D 1/0248 |
| | | | 701/2 |
| 2015/0348417 A1 | 12/2015 | Ignaczak et al. | |
| 2017/0032517 A1 | 2/2017 | Akasaka et al. | |
| 2017/0153644 A1 | 6/2017 | Otsuka et al. | |
| 2018/0038689 A1 | 2/2018 | Takemura et al. | |
| 2018/0154939 A1 | 6/2018 | Aoki | |
| 2018/0156736 A1 | 6/2018 | Kondo et al. | |
| 2018/0157272 A1 | 6/2018 | Suzuki | |
| 2018/0178766 A1 | 6/2018 | Oba | |
| 2018/0188735 A1 | 7/2018 | Sugawara et al. | |
| 2018/0232582 A1 | 8/2018 | Yanagawa et al. | |
| 2018/0354518 A1 | 12/2018 | Inou et al. | |
| 2018/0362051 A1 | 12/2018 | Hu | |
| 2018/0365849 A1 | 12/2018 | Taguchi et al. | |
| 2019/0025841 A1* | 1/2019 | Haynes | B60W 30/00 |
| 2019/0049968 A1* | 2/2019 | Dean | G06V 20/58 |
| 2019/0064843 A1 | 2/2019 | Matsui et al. | |
| 2019/0265699 A1 | 8/2019 | Yabuuchi et al. | |
| 2019/0266745 A1 | 8/2019 | Gomezcaballero et al. | |

FOREIGN PATENT DOCUMENTS

| | | |
|---|---|---|
| JP | 2004-220348 A | 8/2004 |
| JP | 2006-085285 A | 3/2006 |
| JP | 2009-532801 A | 9/2009 |
| JP | 2010-182236 A | 8/2010 |
| JP | 2011-145204 A | 7/2011 |
| JP | 2015-506310 A | 3/2015 |
| JP | 2016-38689 A | 3/2016 |

* cited by examiner

TARGET ABNORMALITY DETERMINATION DEVICE

CROSS-REFERENCE TO RELATED APPLICATION

This application is a continuation of U.S. application Ser. No. 16/042,525, filed Jul. 23, 2018 (allowed), which claims the benefit of priority from Japanese Patent Application No. 2017-173023, filed on Sep. 8, 2017. The entire disclosures of the prior applications are considered part of the disclosure of the accompanying continuation application, and are hereby incorporated by reference.

TECHNICAL FIELD

The present disclosure relates to a vehicle control device controlling traveling of a vehicle.

BACKGROUND

Known is a vehicle control device controlling traveling of a host vehicle based on a detection result regarding vehicles around the host vehicle. For example, Japanese Unexamined Patent Publication No. 2011-145204 discloses a device detecting moving bodies such as vehicles around the host vehicle by using a sensor such as a laser sensor and tracking motions of the detected moving bodies.

SUMMARY

In the device disclosed in Japanese Unexamined Patent Publication No. 2011-145204, moving object motion estimation accuracy may be reduced when, for example, a tracking-object moving object is re-detected after a temporary detection failure. When the moving object motion estimation accuracy is low, the vehicle control device is not capable of appropriately controlling the traveling of the host vehicle when the traveling of the host vehicle is controlled based on motions of tracking-object moving bodies. Accordingly, the presence or absence of an abnormality of estimation of a motion of a tracking-object moving object needs to be accurately determined for the vehicle control device.

The present disclosure relates to a vehicle control device controlling traveling of a host vehicle. The vehicle control device includes a detection unit configured to detect a moving object around the host vehicle, a tracking unit configured to track the moving object based on a detection result of the detection unit and estimate a motion of the moving object, a type determination unit configured to determine a type of the moving object, a model storage unit configured to store a plurality of motion models determined in advance for each moving object type and indicating the motion of the moving object, a model selection unit configured to select the motion model corresponding to the moving object type determined by the type determination unit among the plurality of motion models stored in the model storage unit, an abnormality determination unit configured to determine a presence or absence of an abnormality of the estimation of the motion of the moving object by comparing the motion of the moving object estimated by the tracking unit and the motion indicated by the motion model selected by the model selection unit to each other for a predetermined time, and a control unit configured to control the traveling of the host vehicle. A control mode in which the control unit is configured to control the traveling of the host vehicle when the abnormality determination unit determines that the abnormality is present differs from a control mode in which the control unit is configured to control the traveling of the host vehicle when the abnormality determination unit determines that the abnormality is absent.

The abnormality determination unit of the vehicle control device is configured to determine the presence or absence of the abnormality of the estimation of the motion of the moving object by comparing the motion of the moving object estimated by the tracking unit and the motion indicated by the motion model selected by the model selection unit to each other for the predetermined time. The motion model used for the determination of the presence or absence of the abnormality is a model corresponding to a moving object type and appropriately indicates a moving object motion. By using the motion model corresponding to a moving object type as described above, the vehicle control device is capable of accurately determining the presence or absence of the abnormality of the estimation of a motion of a tracking-object moving object.

The vehicle control device may further include a moving object position acquisition unit configured to acquire a position of the moving object on a map. The motion model may be determined in advance with respect to each position on the map and the model selection unit may be configured to select the motion model corresponding to the position of the moving object acquired by the moving object position acquisition unit. A constraint may be applied to a moving object movement (such as a maximum speed) depending on, for example, whether the position of the moving object on the map is on a general road or a highway. In other words, different positions on the map have different moving object motion models. The model selection unit is configured to be capable of selecting an appropriate motion model in accordance with each position on the map by selecting a motion model corresponding to a moving object position. As a result, the vehicle control device is capable of accurately determining the presence or absence of the abnormality of the estimation of a motion of a tracking-object moving object.

The vehicle control device may further include a traveling state recognition unit configured to recognize a traveling state of the host vehicle. The motion model may be determined in advance for each traveling state of the moving object and the model selection unit may be configured to select the motion model corresponding to the traveling state of the host vehicle recognized by the traveling state recognition unit. In the case of traveling of a plurality of vehicles, for example, the plurality of vehicles may perform the same motion, examples of which include the plurality of vehicles traveling at the same speed. In other words, it is conceivable that another vehicle (moving object) performs the same motion as the host vehicle. Accordingly, the model selection unit is configured to be capable of selecting an appropriate motion model corresponding to a moving object motion by selecting a motion model corresponding to the traveling state of the host vehicle as a moving object motion model. As a result, the vehicle control device is capable of accurately determining the presence or absence of the abnormality of the estimation of a motion of a tracking-object moving object.

The motion model includes may include a longitudinal direction parameter as an extension direction parameter of a road where the moving object is present and a lateral direction parameter as a width direction parameter of the road where the moving object is present. The longitudinal direction parameter may include at least any one of a speed of the moving object in an extension direction of the road, an acceleration of the moving object in the extension direction of the road, and a position of the moving object in the extension direction of the road. The lateral direction parameter may include at least any one of a speed of the moving object in a width direction of the road, an acceleration of the moving object in the width direction of the road, a position of the moving object in the width direction of the road, and a direction of the moving object. By the motion model including the longitudinal direction parameter and the lateral direction parameter as described above, the motion of a tracking-object moving object can be appropriately indicated by the motion model.

The vehicle control device may further include a positional relationship recognition unit configured to recognize a positional relationship between the host vehicle and the moving object determined to have the motion estimation abnormality based on the detection result of the detection unit. The control unit may be configured to determine the control mode for the control of the traveling of the host vehicle performed when the abnormality determination unit determines that the abnormality is present in accordance with the positional relationship recognized by the positional relationship recognition unit. In this case, the vehicle control device is capable of determining the control mode for the traveling of the host vehicle in accordance with the positional relationship between the host vehicle and a tracking object determined to have the motion estimation abnormality.

The vehicle control device may further include a notification unit configured to provide a notification with respect to a driver of the host vehicle. The control unit may be configured to decelerate the host vehicle and the notification unit may be configured to provide the notification for the driver of the host vehicle when the positional relationship recognition unit recognizes that the moving object determined to have the motion estimation abnormality is positioned in front of the host vehicle. As a result, a decrease in the distance between the host vehicle and the moving object in front of the host vehicle determined to have the motion estimation abnormality can be suppressed. In addition, as a result of the notification for the driver, the driver can recognize the occurrence of a motion estimation abnormality of the moving object in front and the driver himself or herself can take action such as a driving operation for the host vehicle.

The control unit may be configured to allow the host vehicle to perform autonomous traveling in a lane change-prohibited state when the positional relationship recognition unit recognizes that the moving object determined to have the motion estimation abnormality is present at a parallel traveling position with respect to the host vehicle. In this case, the host vehicle becoming close to the moving object determined to have the motion estimation abnormality due to lane change by the host vehicle can be suppressed.

When the positional relationship recognition unit recognizes that the moving object determined to have the motion estimation abnormality is positioned behind the host vehicle and another moving object is detected in front of the host vehicle by the detection unit, the control unit may be configured to accelerate the host vehicle such that a distance between the host vehicle and the moving object in front does not become a predetermined distance or less and a speed of the host vehicle does not exceed a speed limit set on a road where the host vehicle travels. When the positional relationship recognition unit recognizes that the moving object determined to have the motion estimation abnormality is positioned behind the host vehicle and no moving object is detected in front of the host vehicle by the detection unit, the control unit may be configured to accelerate the host vehicle such that the speed of the host vehicle does not exceed the speed limit set on the road where the host vehicle travels. As a result, a decrease in the distance between the host vehicle and the moving object behind the host vehicle determined to have the motion estimation abnormality can be suppressed. In addition, when another moving object is detected in front of the host vehicle, the host vehicle becoming excessively close to the moving object in front can be suppressed. Furthermore, the speed of the host vehicle exceeding the speed limit can be suppressed.

According to the present disclosure, the presence or absence of an abnormality of estimation of a motion of a tracking-object moving object can be accurately determined.

DETAILED DESCRIPTION

Figure 1:
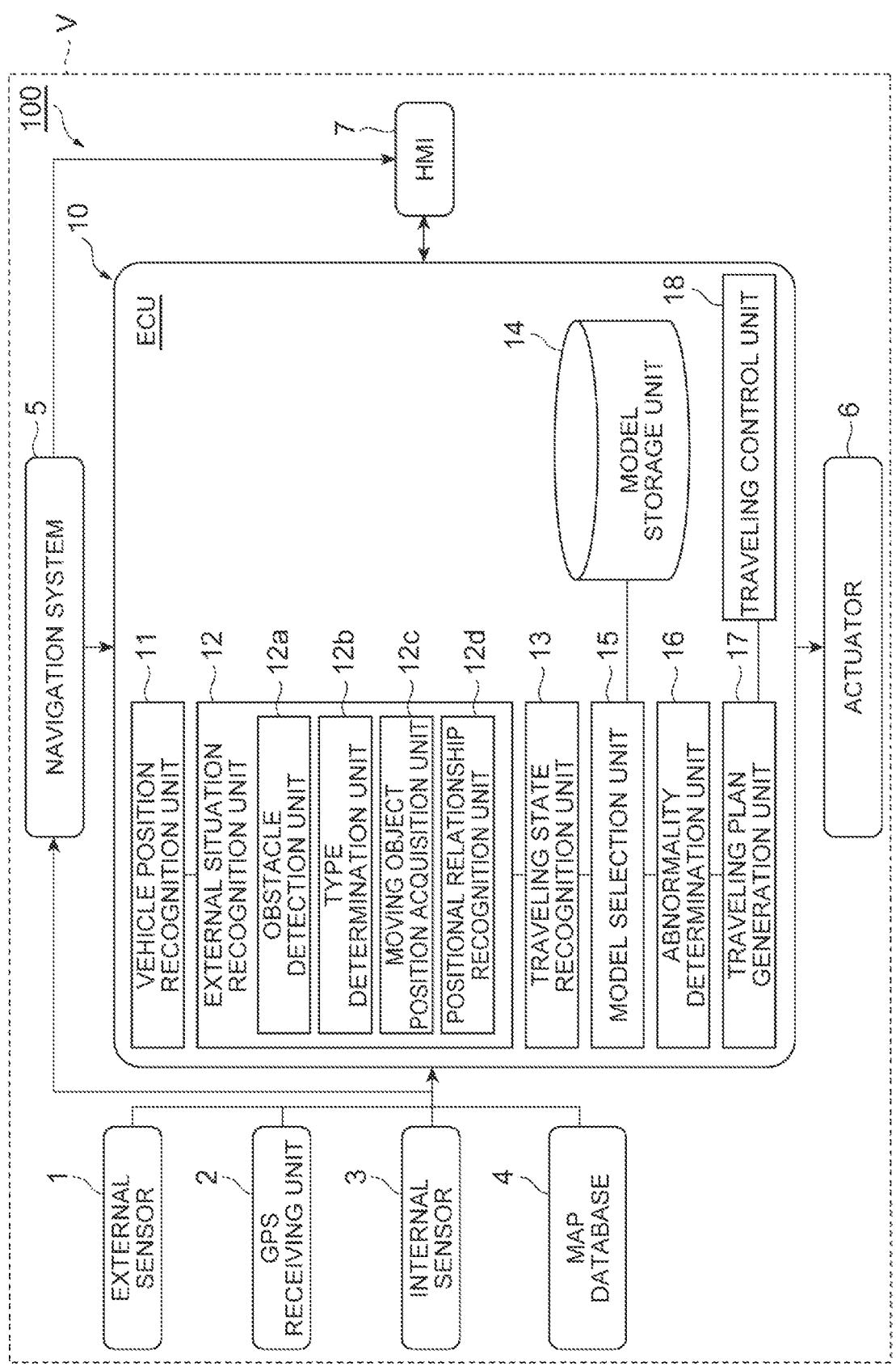
FIG. 1 is a diagram illustrating a schematic configuration of a vehicle control device according to an embodiment.

Hereinafter, an embodiment of the present disclosure will be described with reference to accompanying drawings. In the description of the drawings, the same reference numerals will be used to refer to the same elements so that duplicate description is omitted.

As illustrated in FIG. 1, a vehicle control device 100 according to the present embodiment executes autonomous driving control as control of the traveling of a host vehicle V so that the host vehicle V performs autonomous traveling. The host vehicle V is put into an autonomous driving state by the autonomous driving control being executed. The autonomous driving state is a driving state where a driver does not have to perform any driving operation and the driving control for the host vehicle V including speed control and steering control is executed by the vehicle control device 100.

The vehicle control device 100 is provided with an electronic control unit [ECU] 10 for controlling the autonomous driving and so on of the host vehicle. The ECU 10 is an electronic control unit that has a central processing unit [CPU], a read only memory [ROM], a random access memory [RAM], and the like. The ECU 10 executes various types of control by loading a program stored in the ROM into the RAM and executing the program with the CPU. A plurality of electronic control units may constitute the ECU 10 as well. In addition, some of the functions of the ECU 10 to be described below may be executed in a computer in a facility such as an information processing center capable of communicating with the host vehicle V.

An external sensor (detection unit) 1, a GPS receiving unit 2, an internal sensor 3, a map database 4, a navigation system 5, an actuator 6, and a human machine interface [HMI] 7 are connected to the ECU 10.

The external sensor 1 is detection equipment detecting a situation (moving object) around the host vehicle V. The external sensor 1 includes at least one of a camera and a radar sensor.

The camera is imaging equipment imaging the external situation around the host vehicle V. The camera is disposed to be capable of imaging the surroundings of the host vehicle V. The camera transmits imaging information related to the external situation regarding the host vehicle V to the ECU 10. The camera may be a monocular camera or may be a stereo camera. The stereo camera has two imaging units that are placed to reproduce a binocular disparity. Depth direction information is also included in the imaging information of the stereo camera.

The radar sensor is detection equipment detecting obstacles around the host vehicle V by using radio waves (such as millimeter waves) or light. The radar sensor includes, for example, millimeter wave radar or light detection and ranging [LIDAR]. The radar sensor detects the obstacles by transmitting the radio waves or the light to the surroundings of the host vehicle V and receiving the radio waves or the light reflected by the obstacles. The radar sensor transmits detected obstacle information to the ECU 10. The obstacles include moving obstacles such as pedestrians and vehicles as well as fixed obstacles such as guardrails and buildings.

The GPS receiving unit 2 measures the position of the host vehicle V (such as the latitude and the longitude of the host vehicle V) by receiving signals from at least three GPS satellites. The GPS receiving unit 2 transmits measured positional information regarding the host vehicle V to the ECU 10.

The internal sensor 3 is detection equipment detecting the traveling state of the host vehicle V. The internal sensor 3 includes a vehicle speed sensor, an acceleration sensor, and a yaw rate sensor. The vehicle speed sensor is a detector that detects the speed of the host vehicle V. A vehicle wheel speed sensor that is disposed with respect to a vehicle wheel of the host vehicle V, a drive shaft rotating integrally with the vehicle wheel, or the like and detects the rotation speed of the vehicle wheel is used as the vehicle speed sensor. The vehicle speed sensor transmits detected vehicle speed information to the ECU 10.

The acceleration sensor is a detector that detects the acceleration of the host vehicle V. The acceleration sensor includes a longitudinal acceleration sensor detecting the acceleration of the host vehicle V in a longitudinal direction and a lateral acceleration sensor detecting the lateral acceleration of the host vehicle V. The acceleration sensor transmits acceleration information regarding the host vehicle V to the ECU 10. The yaw rate sensor is a detector that detects the yaw rate (rotation angular velocity) around the vertical axis of the center of gravity of the host vehicle V. A gyro sensor can be used as an example of the yaw rate sensor. The yaw rate sensor transmits detected yaw rate information regarding the host vehicle V to the ECU 10.

The map database 4 is a database in which map information is stored. The map database 4 is formed within a hard disk drive [HDD] that is mounted in the host vehicle V. The map information includes, for example, positional information regarding roads, road shape information, road type information (such as the types of general roads and highways), positional information regarding junctions and intersection points, speed limits set for roads, and positional information regarding buildings. The map database 4 may be stored in the computer in the facility such as the information processing center capable of communicating with the host vehicle V.

The navigation system 5 is a system that guides the driver of the host vehicle V to a destination set in advance. The navigation system 5 generates a path from the current position of the host vehicle V to the destination based on the position of the host vehicle V measured by the GPS receiving unit 2 and the map information in the map database 4. The navigation system 5 performs the guiding of the path with respect to the driver by image display and voice output of the HMI 7 (described later). The navigation system 5 transmits information related to the destination of the host vehicle V and the path of the vehicle to the ECU 10. The vehicle control device 100 does not necessarily have to be provided with the navigation system 5. The generation of the path of the host vehicle V may be performed by the ECU 10 as well. The destination may be set by an occupant or may be automatically set by a known method by the navigation system 5 or the like.

The actuator 6 is a device that controls the traveling of the host vehicle V. The actuator 6 includes at least an engine actuator, a brake actuator, and a steering actuator. The engine actuator controls the drive force of the host vehicle V by changing the amount of air supply to an engine (by changing, for example, a throttle opening degree) in accordance with a control signal from the ECU 10. When the host vehicle V is a hybrid vehicle or an electric vehicle, the engine actuator controls the drive force of a motor as a power source.

The brake actuator controls a brake system in accordance with a control signal from the ECU 10 and controls a braking force given to the vehicle wheel of the host vehicle V. A hydraulic brake system can be used as an example of the brake system. When the host vehicle V is provided with a regenerative brake system, the brake actuator may control both the hydraulic brake system and the regenerative brake system. The steering actuator controls, in accordance with a control signal from the ECU 10, driving of an assist motor that controls a steering torque in an electric power steering system. In this manner, the steering actuator controls the steering torque of the host vehicle V.

The HMI (notification unit) 7 is an interface for information output and input between the occupant of the host vehicle V and the vehicle control device 100. The HMI 7 is provided with, for example, a display and a speaker. The HMI 7 performs the image output on the display and the voice output from the speaker in accordance with a control signal from the ECU 10. The display may be a head-up display. The HMI 7 is provided with, for example, input equipment (such as a button, a touch panel, and a voice input device) for receiving input from the occupant.

The HMI 7 functions also as a notification unit providing a notification for the driver of the host vehicle V. In this case, the HMI 7 performs the notification with respect to the driver by displaying a notification image on the display or outputting a notification voice or the like from the speaker. A timing when the HMI 7 performs the notification will be described in detail later.

Functionally, the ECU 10 is provided with a vehicle position recognition unit 11, an external situation recognition unit 12, a traveling state recognition unit 13, a model storage unit 14, a model selection unit 15, an abnormality determination unit 16, a traveling plan generation unit (control unit) 17, and a traveling control unit (control unit) 18.

The vehicle position recognition unit 11 recognizes the position of the host vehicle V on a map based on the positional information of the GPS receiving unit 2 and the map information of the map database 4. The vehicle position recognition unit 11 may also recognize the position of the host vehicle V with existing SLAM technology by using the detection result of the external sensor 1 and the positional information included in the map information of the map database 4 and related to fixed obstacles such as an electric pole.

The external situation recognition unit 12 recognizes the external situation around the host vehicle V based on the detection result of the external sensor 1. The external situation recognition unit 12 recognizes the external situation regarding the host vehicle V including the positions of obstacles around the host vehicle V by a known method and based on an image captured by the camera and/or the obstacle information of the radar sensor.

Specifically, the external situation recognition unit 12 is provided with an obstacle detection unit (tracking unit) 12a, a type determination unit 12b, a moving object position acquisition unit 12c, and a positional relationship recognition unit 12d.

The obstacle detection unit 12a detects the obstacles around the host vehicle V (positions of the obstacles) based on the detection result of the external sensor 1. In addition, the obstacle detection unit 12a tracks moving bodies among the obstacles around the host vehicle V and estimates motions of the moving bodies based on the detection result of the external sensor 1. The moving bodies that are the tracking objects of the obstacle detection unit 12a are, for example, persons and vehicles (such as bicycles, ordinary cars, and large cars). The obstacle detection unit 12a tracks the moving bodies and estimates the motions thereof by a known method and based on an image captured by the camera and/or the obstacle information of the radar sensor. In addition, the obstacle detection unit 12a retains (stores) motions of objects within a predetermined past period that ends at the current point in time.

A case where the obstacle detection unit 12a estimates the motions of the moving bodies by using the detection result of the LIDAR will be described as an example. The obstacle detection unit 12a calculates a moving object movement amount by performing point group pattern matching with respect to moving object detection results detected at timings different in time. The obstacle detection unit 12a is capable of estimating the movement position and speed of a moving object by inputting the calculated movement amount to a Kalman filter. When the pattern that is extracted from the characteristics of the point group of the moving object detected by the LIDAR is stable, the obstacle detection unit 12a is capable of appropriately tracking the movement of the moving object by pattern matching. As a result, the motion (acceleration, yaw rate, and so on) of the moving object estimated by the obstacle detection unit 12a is also a stable motion. When the pattern that is extracted from the characteristics of the point group of the moving object detected by the LIDAR is unstable, the moving object cannot be appropriately tracked by pattern matching. Accordingly, the motion (acceleration, yaw rate, and so on) of the moving object estimated by the obstacle detection unit 12a is unstable. The motion of the moving object estimated by the obstacle detection unit 12a is unstable also when the moving object tracked thus far by point group pattern matching is temporarily lost and a different moving object is tracked as the same moving object by mistake upon re-detection.

When a plurality of moving bodies is detected by the external sensor 1, the obstacle detection unit 12a regards one or more moving bodies as tracking-object moving bodies and estimates motions of the tracking-object moving bodies.

The type determination unit 12b determines the type of a moving object whose motion is estimated by the obstacle detection unit 12a based on the detection result of the external sensor 1. The type determination unit 12b is capable of determining the type of the moving object based on an image captured by the camera and/or the obstacle information of the radar sensor and by a known method such as comparison between the shape pattern of a detected object and a reference pattern determined in advance for each moving object type. The type determination unit 12b determines the types of persons, bicycles, small cars, large cars, and so on as the types of moving bodies.

The moving object position acquisition unit 12c acquires the position of a moving object whose motion is estimated by the obstacle detection unit 12a on the map. For example, the moving object position acquisition unit 12c may acquire the position of the moving object on the map based on the position of the host vehicle V on the map recognized by the vehicle position recognition unit 11 and the position of the moving object with respect to the host vehicle V obtained based on the detection result of the external sensor 1.

The positional relationship recognition unit 12d recognizes the positional relationship between the host vehicle V and a moving object based on the detection result of the external sensor 1 after the abnormality determination unit 16 determines that the moving object has a motion estimation abnormality. For example, the positional relationship recognition unit 12d recognizes whether or not the moving object determined to have the motion estimation abnormality is a moving object (preceding vehicle) positioned in front of the host vehicle V. The positional relationship recognition unit 12d recognizes whether or not the moving object determined to have the motion estimation abnormality is a moving object (parallel traveling vehicle) present at a parallel traveling position with respect to the host vehicle V. The moving object (parallel traveling vehicle) that is present at the parallel traveling position with respect to the host vehicle V is a moving object moving in an adjacent lane adjacent to the traveling lane of the host vehicle V. The moving object and the host vehicle V traveling in parallel to each other means a state where the distance between the moving object and the host vehicle V is equal to or less than a predetermined distance in the extension direction of the traveling lane of the host vehicle V. The positional relationship recognition unit 12d recognizes whether or not the moving object determined to have the motion estimation abnormality is a moving object (following vehicle) positioned behind the host vehicle V.

The traveling state recognition unit 13 recognizes the traveling state of the host vehicle V including the vehicle speed and direction of the host vehicle V based on the detection result of the internal sensor 3. Specifically, the traveling state recognition unit 13 recognizes the vehicle speed of the host vehicle V based on the vehicle speed information of the vehicle speed sensor. The traveling state recognition unit 13 recognizes the direction of the host vehicle V based on the yaw rate information of the yaw rate sensor.

The model storage unit 14 stores a plurality of motion models determined in advance for each moving object type. The motion models are models indicating motions of moving bodies. The characteristics of the motions of the moving bodies are different from moving object type to moving object type. For example, an automobile is incapable of moving in a lateral direction whereas a person can move in the lateral direction. For example, a small car is capable of rotating with a smaller radius than a large car. The plurality of motion models is stored for each moving object type in accordance with the types of moving bodies, that is, the characteristics of motions of moving bodies as described above.

A known model indicating a motion of a moving object can be used as the motion model. The motion model may be a known vehicle model indicating a vehicle motion or a model in which a motion constraint (such as an upper limit value) is set by an operator or the like.

The motion model may also include a longitudinal direction parameter as an extension direction parameter of the road where a moving object is present and a lateral direction parameter as a width direction parameter of the road where the moving object is present. The longitudinal direction parameter may include at least any one of the speed of the moving object in the extension direction of the road, the acceleration of the moving object in the extension direction of the road, and the position of the moving object in the extension direction of the road. The lateral direction parameter may include at least any one of the speed of the moving object in the width direction of the road, the acceleration of the moving object in the width direction of the road, the position of the moving object in the width direction of the road, and the direction of the moving object.

The model that is disclosed in "Model Based Vehicle Tracking for Autonomous Driving in Urban Environments" (by Anna Petrovskaya and Sebastian Thrun) may be used as a specific example of the motion model.

As another specific example of the motion model, motion model 1 is [x, y, vx, vy] and motion model 2 is [x, y, θ, v]. x and y are positions in an xy coordinate system set on a road surface. vx and vy are the speeds of the moving object in the x-axis direction and the y-axis direction of the xy coordinate system, respectively. θ is the direction (traveling direction) of the moving object. v is the speed of the moving object.

In this case, motion model 1 is a mass point model and a model in which the moving object is capable of moving sideways (in the direction orthogonal to the direction in which the moving object faces). Accordingly, motion model 1 can be used as a motion model of a person (pedestrian). Motion model 2 is a general vehicle model and is a model not allowing bending at a speed v of zero. Accordingly, motion model 2 can be used in a vehicle such as an automobile and a bicycle.

Simply the speed, acceleration, or the like may also be used as yet another specific example of the motion model. For example, a person's movement speed and the movement speed of a vehicle differ from each other. Accordingly, the speed, acceleration, or the like depending on moving object type may be used as the motion model.

In addition, the motion model is determined in advance with respect to each position on the map as well as the moving object type. The characteristics of motions differ from moving object position to moving object position. For example, different places where an automobile travels have different traffic rules (speed limits and so on), and thus the different places where the automobile travels have different motion characteristics (maximum speeds and so on). In addition, for example, the acceleration of an automobile during traveling on a straight road differs from that during traveling at an intersection point. The moving object has different motion characteristics depending on its position as described above, and thus models depending on positions on the map are set in advance as the motion models.

Specifically, for example, the value of "−0.3 G<acceleration<0.3 G" may be set as the acceleration of the motion model in a longitudinal direction (road extension direction) in the case of automobile traveling on a straight road. The value of "−0.7 G<acceleration<0.3 G" may be set as the acceleration of the motion model in the longitudinal direction in the case of automobile traveling at an intersection point. In other words, the motion model in the case of automobile traveling at an intersection point may be a model assuming rapid deceleration attributable to strong brake pedal depression.

When the motion model is determined in advance with respect to each position on the map, the motion model may be generated based on the past traveling state of a vehicle or the like. For example, the motion model of an automobile at each point may be determined based on a traveling state-detecting probe car (traveling state-collecting automobile) or the traveling state at a time of past traveling of the host vehicle V or the like at each point.

In this manner, the motion model is determined in advance for each moving object type and each position on the map.

The motion model may also be determined in advance for each moving object traveling state (movement state) instead of each position on the map. For example, the motion model may be determined for each moving object movement speed as the moving object traveling state. When the moving object is an automobile, for example, the motion model may be determined for each automobile speed within a speed limit. In this case, the motion model may be determined in advance for each moving object type and each moving object traveling state.

The model selection unit 15 selects the motion model that corresponds to the object type determined by the type determination unit 12b among the plurality of motion models stored in the model storage unit 14. For example, the model selection unit 15 selects a motion model corresponding to a person when the type determination unit 12b determines that the object is a person.

In addition, the model selection unit 15 selects the motion model that corresponds to the moving object position acquired by the moving object position acquisition unit 12c in addition to the moving object type. For example, the type determination unit 12b determines that the moving object is a small car and the moving object position acquisition unit 12c supposes that the moving object travels at a certain point on the map. In this case, the model selection unit 15 selects the motion model corresponding to the small car and determined with respect to the certain point on the map.

When the motion model is determined in advance for each moving object type and each moving object traveling state, the model selection unit 15 may select the motion model corresponding to the traveling state of the host vehicle V recognized by the traveling state recognition unit 13 in addition to the moving object type. In the case of traveling of a plurality of vehicles, for example, the plurality of vehicles may perform the same motion, examples of which include the plurality of vehicles traveling at the same speed. In other words, it is conceivable that another automobile performs the same motion as the host vehicle V. When the host vehicle V travels at 60 kilometers per hour, for example, it is conceivable that another automobile around the host vehicle V also travels at 60 kilometers per hour. Accordingly, when the host vehicle V travels at 60 kilometers per hour, the model selection unit 15 selects a motion model of traveling at 60 kilometers per hour. The model selection unit 15 is not limited to selecting the motion model of the traveling state that completely corresponds to the traveling state of the host vehicle V and may also select a motion model of a traveling state where the difference from the traveling state of the host vehicle V is within a predetermined value.

The abnormality determination unit 16 determines the presence or absence of a moving object motion estimation abnormality by comparing the moving object motion estimated by the obstacle detection unit 12a and the motion indicated by the motion model selected by the model selection unit 15 to each other for a predetermined time. When moving object tracking is appropriately performed in the obstacle detection unit 12a, for example, the moving object motion estimated by the obstacle detection unit 12a and the motion indicated by the motion model selected by the model selection unit 15 are almost the same as each other. When moving object tracking is not appropriately performed in the obstacle detection unit 12a, the moving object motion estimated by the obstacle detection unit 12a and the motion indicated by the motion model selected by the model selection unit 15 are significantly different from each other. Accordingly, the abnormality determination unit 16 determines that the moving object motion estimation has an abnormality when the estimated moving object motion differs from the motion indicated by the motion model by a predetermined value or more and determines that the moving object motion estimation has no abnormality when the estimated moving object motion does not differ from the motion indicated by the motion model by the predetermined value or more.

The abnormality determination unit 16 compares the moving object motion estimated by the obstacle detection unit 12a and the motion indicated by the motion model selected by the model selection unit 15 to each other for the predetermined time. When comparing the estimated moving object motion and the motion indicated by the motion model to each other for the predetermined time, the abnormality determination unit 16 determines that the moving object motion estimation has the abnormality when the two motions differ from each other by the predetermined value or more.

For example, the abnormality determination unit 16 sets a moving object motion constraint based on a selected motion model. Then, the abnormality determination unit 16 may determine the presence or absence of an abnormality based on whether or not the estimated moving object motion is within the set motion constraint. In this case, the abnormality determination unit 16 determines that the moving object motion estimation has an abnormality when the estimated moving object motion is out of the set motion constraint.

Specifically, the abnormality determination unit 16 determines that the moving object motion estimation has an abnormality when, for example, any one of the following constraints (1) to (7) is not established. The left-hand sides of the constraints (1) to (7) are values obtained based on the moving object motion estimated by the obstacle detection unit 12a. The right-hand sides of the constraints (1) to (7) are values obtained based on the moving object motion indicated by the motion model selected by the model selection unit 15. The "longitudinal" in the constraints (1) to (7) is the extension direction of the road where a moving object is present and the "lateral" in the constraints (1) to (7) is the width direction of the road where the moving object is present. The abnormality determination unit 16 determines for a predetermined time whether or not the estimated moving object motion (left-hand side) satisfies the constraints (1) to (7) (right-hand side)

(1) |estimated longitudinal movement distance of moving object|<|maximum longitudinal movement distance of motion model|
(2) |estimated lateral movement distance of moving object|<|maximum lateral movement distance of motion model|
(3) |estimated longitudinal movement speed of moving object|<|maximum longitudinal movement speed of motion model|
(4) |estimated lateral movement speed of moving object|<|maximum lateral movement speed of motion model|
(5) |estimated longitudinal acceleration of moving object|<|maximum longitudinal acceleration of motion model|
(6) |estimated lateral acceleration of moving object|<|maximum lateral acceleration of motion model|
(7) |estimated yaw rate of moving object|<|yaw rate of motion model|

Although the abnormality determination unit 16 compares the estimated moving object motion and the motion indicated by the selected motion model to each other for the predetermined time, the predetermined time may not be a predetermined time determined in advance and may also be changed. For example, the abnormality determination unit 16 may change the predetermined time based on the traveling state of the host vehicle V. For example, the abnormality determination unit 16 may change the predetermined time based on the speed of the host vehicle V. In this case, the abnormality determination unit 16 may lengthen the predetermined time as the speed of the host vehicle V decreases. In addition, the abnormality determination unit 16 may change the predetermined time based on the relative speed of the host vehicle V and the moving object that is a motion estimation object. In this case, an inter-vehicle distance increases as the relative speed (relative speed=speed of moving object−speed of host vehicle V) increases on the plus side, and thus the abnormality determination unit 16 may lengthen the predetermined time as the relative speed increases on the plus side. The inter-vehicle distance decreases as the relative speed increases on the minus side, and thus the abnormality determination unit 16 may shorten the predetermined time as the relative speed increases on the minus side.

The traveling plan generation unit 17 generates a traveling plan of the host vehicle V based on a target route set by the navigation system 5, the map information of the map database 4, the external situation around the host vehicle V recognized by the external situation recognition unit 12 (including the moving object motion estimated by the obstacle detection unit 12a), and the traveling state of the host vehicle V recognized by the traveling state recognition unit 13. The traveling plan generation unit 17 initiates the traveling plan generation when the driver performs an autonomous driving control initiation operation. The traveling plan is a traveling plan for the host vehicle V to reach a destination set in advance from the current position of the host vehicle V.

The traveling plan includes a control target value for the host vehicle V depending on the position of the host vehicle V on the target route. The position on the target route is a position in the extension direction of the target route on the map. The positions on the target route mean setting longitudinal positions set at predetermined intervals (such as 1 m) in the extension direction of the target route. The control target value is a value that becomes a control target for the host vehicle V in the traveling plan. The control target value includes a target vehicle speed and a target trajectory. The target vehicle speed is a value that becomes a control target for the vehicle speed of the host vehicle V in a normal traveling plan. The target trajectory is a value that becomes a control target for the trajectory along which the host vehicle V travels. A target steering angle that is a control target for the steering angle of the host vehicle V is calculated from the target trajectory.

The target vehicle speed is set in accordance with positions on the path along which the host vehicle V travels by the autonomous driving control. The path along which the host vehicle V travels by the autonomous driving control is a target route for the autonomous driving control connecting a destination set in advance to the current position of the vehicle on the map. The positions on the path are positions in the extension direction of the path on the map. Specifically, the positions on the path can be setting longitudinal positions set at predetermined intervals (such as 1 m) in the extension direction of the path. Methods for setting the setting longitudinal position are not limited to the method described above. In a normal traveling plan, the target vehicle speed is set for each setting longitudinal position.

A target acceleration or a target jerk may be used instead of the target vehicle speed. In addition, a target steering angle, a target steering angular velocity, a target steering torque, or a target lateral position (width direction position of the vehicle on a target road) may be set for each setting longitudinal position in addition to the target trajectory. A known parameter related to vehicle control may also be added to the control target value.

In addition, when the abnormality determination unit 16 determines that there is an abnormality, the traveling plan generation unit 17 generates a traveling plan with a control mode differing from that when the abnormality determination unit 16 determines that there is no abnormality. When the abnormality determination unit 16 determines that there is an abnormality, a transition to a fail mode occurs in the control mode for the traveling of the host vehicle V. Accordingly, when the abnormality determination unit 16 determines that there is an abnormality, the traveling plan generation unit 17 generates a traveling plan for the fail mode. When the abnormality determination unit 16 determines that there is no abnormality, the traveling plan generation unit 17 generates the traveling plan for a normal mode as described above. The traveling plan for the fail mode will be described below.

When the abnormality determination unit 16 determines that there is an abnormality, it is conceivable that appropriate moving object tracking by the obstacle detection unit 12a is impossible. Accordingly, for example, the traveling plan generation unit 17 generates a traveling plan for the host vehicle V to keep at least a predetermined distance from a moving object determined by the abnormality determination unit 16 to have a motion estimation abnormality or for the host vehicle V to be separated from the moving object determined to have the abnormality.

Specifically, the traveling plan generation unit 17 is capable of determining a traveling plan generated when the abnormality determination unit 16 determines that there is an abnormality in accordance with the positional relationship recognized by the positional relationship recognition unit 12d.

For example, when the positional relationship recognition unit 12d recognizes that the moving object determined to have the motion estimation abnormality is positioned in front of the host vehicle V, the traveling plan generation unit 17 is capable of generating a traveling plan for decelerating the host vehicle V. When the positional relationship recognition unit 12d recognizes that the moving object determined to have the motion estimation abnormality is positioned in front of the host vehicle V, the HMI 7 is capable of providing a notification for the driver of the host vehicle V so that the driver himself or herself performs an accelerator or brake operation.

For example, when the positional relationship recognition unit 12d recognizes that the moving object determined to have the motion estimation abnormality is present at the parallel traveling position with respect to the host vehicle V, the traveling plan generation unit 17 is capable of generating a traveling plan for autonomous host vehicle traveling in a lane change-prohibited state. When the positional relationship recognition unit 12d recognizes that the moving object determined to have the motion estimation abnormality is present at the parallel traveling position with respect to the host vehicle V, the HMI 7 is capable of providing a notification for the driver of the host vehicle V so that the driver himself or herself performs a lane change operation if needed. When the abnormality determination unit 16 determines that there is no motion estimation abnormality, the traveling plan generation unit 17 generates a traveling plan allowing the host vehicle V to change lanes as the traveling plan for the normal mode.

For example, when the positional relationship recognition unit 12d recognizes that the moving object determined to have the motion estimation abnormality is positioned behind the host vehicle V and another moving object is detected in front of the host vehicle V by the external sensor 1, the traveling plan generation unit 17 is capable of generating a traveling plan for accelerating the host vehicle V such that the distance between the host vehicle V and the moving object in front does not become a predetermined distance or less and the speed of the host vehicle V does not exceed the speed limit set on the road where the host vehicle V travels. When no other moving object is detected in front of the host vehicle V by the external sensor 1, the traveling plan generation unit 17 is capable of generating a traveling plan for accelerating the host vehicle V such that the speed of the host vehicle V does not exceed the speed limit set on the road where the host vehicle V travels. The traveling plan generation unit 17 is capable of determining whether or not another moving object is detected in front of the host vehicle V based on the detection result of the obstacle detection unit 12a. The traveling plan generation unit 17 is capable of using a speed limit stored in the map database 4 as the speed limit set on the road.

The traveling control unit 18 executes the autonomous driving control including speed control and steering control for the host vehicle V based on the position of the host vehicle V on the map recognized by the vehicle position recognition unit 11 and the traveling plan generated by the traveling plan generation unit 17. The traveling control unit 18 executes the autonomous driving control by transmitting a control signal to the actuator 6. The driving state of the host vehicle V becomes the autonomous driving state by the traveling control unit 18 executing the autonomous driving control.

When the abnormality determination unit 16 determines that there is no abnormality, the traveling control unit 18 controls the traveling of the host vehicle V based on the traveling plan for the normal mode generated by the traveling plan generation unit 17. When the abnormality determination unit 16 determines that there is an abnormality, the traveling control unit 18 controls the traveling of the host vehicle V based on the traveling plan for the fail mode generated by the traveling plan generation unit 17.

In this manner, the traveling plan generation unit 17 and the traveling control unit 18 function as control units that control the traveling of the host vehicle V in different control modes depending on the presence or absence of an abnormality.

Figure 2:
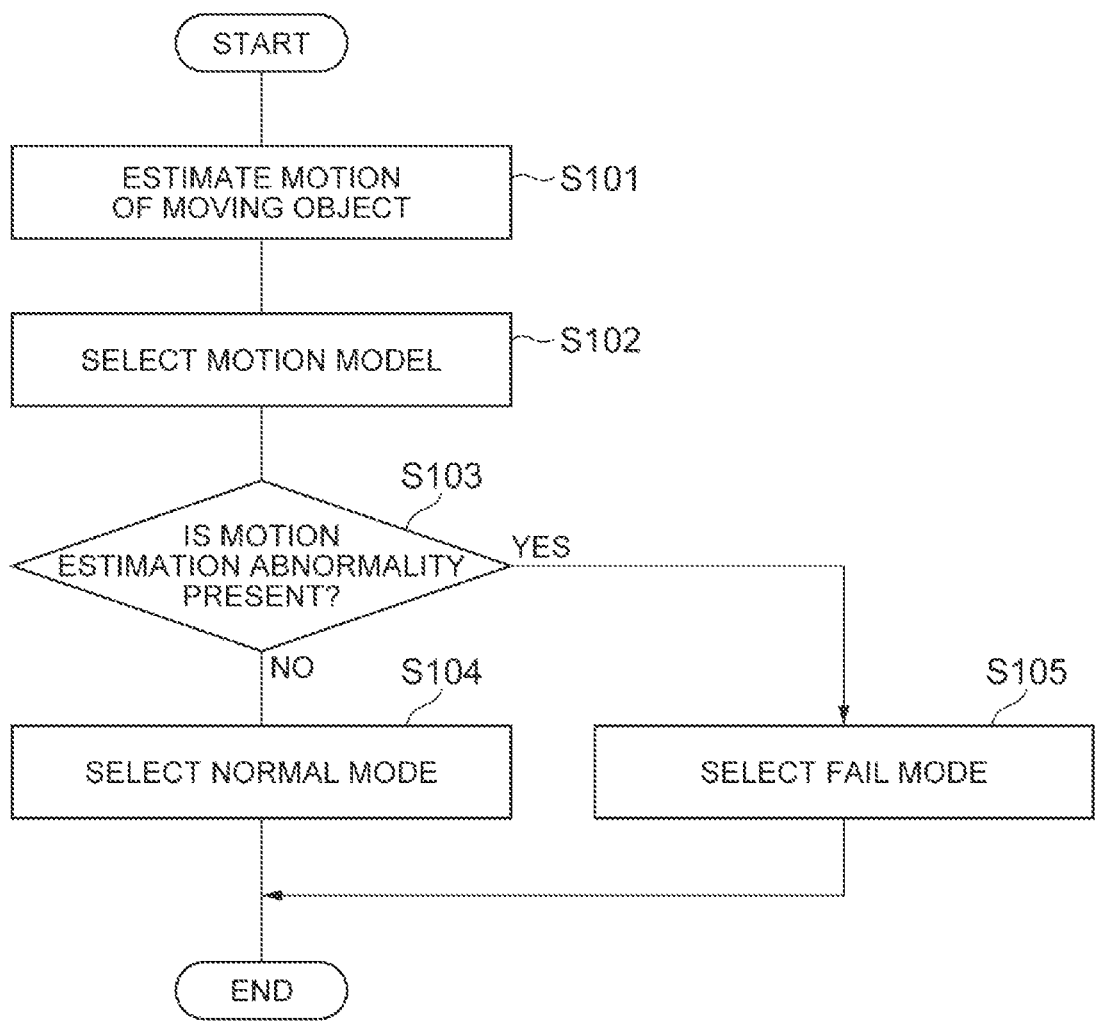
FIG. 2 is a flowchart illustrating the flow of normal mode-fail mode switching determination processing.

Normal mode-fail mode switching determination processing performed by the vehicle control device 100 will be described below. The processing that is illustrated in FIG. 2 is initiated when the driver performs the autonomous driving control initiation operation. In addition, the processing that is illustrated in FIG. 2 is repeatedly executed at predetermined determination time intervals during the execution of the autonomous driving control for the host vehicle V.

The normal mode is selected in advance before the processing illustrated in FIG. 2 is initiated. The vehicle control device 100 controls the traveling of the host vehicle V in the normal mode while the normal mode is selected (between the normal mode state and fail mode selection). In other words, the traveling plan generation unit 17 generates the traveling plan for the normal mode and the traveling control unit 18 performs processing such as controlling of the traveling of the host vehicle V based on the generated traveling plan. The vehicle control device 100 controls the traveling of the host vehicle V in the fail mode while the fail mode is selected (between the fail mode state and normal mode selection). In other words, the traveling plan generation unit 17 generates the traveling plan for the fail mode and the traveling control unit 18 performs processing such as controlling of the traveling of the host vehicle V based on the generated traveling plan.

As illustrated in FIG. 2, the obstacle detection unit 12a estimates a moving object motion based on the detection result of the external sensor 1 (S101). The model selection unit 15 selects a motion model corresponding to, for example, the object type determined by the type determination unit 12b (S102).

The abnormality determination unit 16 determines the presence or absence of a moving object motion estimation abnormality by comparing the moving object motion estimated by the obstacle detection unit 12a and the motion indicated by the motion model selected by the model selection unit 15 to each other for a predetermined time (S103). When the abnormality determination unit 16 determines that there is no motion estimation abnormality (S103: NO), the vehicle control device 100 selects the normal mode as the control mode for the traveling of the host vehicle V (S104). When the normal mode is selected in S104 of the previous processing during the repeated execution of the processing illustrated in FIG. 2, the vehicle control device 100 maintains the normal mode-selected state in the current processing of S104. When the fail mode is selected in S105 of the previous processing, the vehicle control device 100 switches the control mode from the fail mode to the normal mode in the current processing of S104. When the control mode is switched from the fail mode to the normal mode, the HMI 7 may notify the driver of the host vehicle V of the switching to the normal mode.

When the abnormality determination unit 16 determines that there is a motion estimation abnormality (S103: YES), the vehicle control device 100 selects the fail mode as the control mode for the traveling of the host vehicle V (S105). When the fail mode is selected in S105 of the previous processing during the repeated execution of the processing illustrated in FIG. 2, the vehicle control device 100 maintains the fail mode-selected state in the current processing of S105. When the normal mode is selected in S104 of the previous processing, the vehicle control device 100 switches the control mode from the normal mode to the fail mode in the current processing of S105.

The present embodiment is configured as described above, and the abnormality determination unit 16 of the vehicle control device 100 determines the presence or absence of a moving object motion estimation abnormality by comparing the moving object motion estimated by the obstacle detection unit 12a and the motion indicated by the motion model selected by the model selection unit 15 to each other for a predetermined time. The motion model used for the determination of the presence or absence of the abnormality is a model corresponding to a moving object type and appropriately indicates a moving object motion. By using the motion model corresponding to a moving object type as described above, the vehicle control device 100 is capable of accurately determining the presence or absence of the abnormality of the estimation of a motion of a tracking-object moving object. When the abnormality determination unit 16 determines that there is a moving object motion estimation abnormality, the traveling plan generation unit 17 and the traveling control unit 18 control the traveling of the host vehicle V in a control mode differing from that when the abnormality determination unit 16 determines that there is no abnormality. As a result, the vehicle control device 100 is capable of controlling the traveling of the host vehicle V in accordance with the presence or absence of the moving object motion estimation abnormality.

The model selection unit 15 selects a motion model corresponding to the position of a moving object acquired by the moving object position acquisition unit 12c. A constraint may be applied to a moving object movement (such as a maximum speed) depending on, for example, whether the position of the moving object on the map is on a general road or a highway. In other words, different positions on the map have different moving object motion models. The model selection unit 15 is capable of selecting an appropriate motion model in accordance with each position on the map by selecting a motion model corresponding to a moving object position. As a result, the vehicle control device 100 is capable of accurately determining the presence or absence of the abnormality of the estimation of a motion of a tracking-object moving object.

The model selection unit 15 is capable of selecting a motion model corresponding to the traveling state of the host vehicle V. In the case of traveling of a plurality of vehicles, for example, the plurality of vehicles may perform the same motion, examples of which include the plurality of vehicles traveling at the same speed. In other words, it is conceivable that another vehicle (moving object) performs the same motion as the host vehicle V. Accordingly, the model selection unit 15 is capable of selecting a motion model corresponding to a moving object motion by selecting a motion model corresponding to the traveling state of the host vehicle V as a moving object motion model. As a result, the vehicle control device 100 is capable of accurately determining the presence or absence of the abnormality of the estimation of a motion of a tracking-object moving object.

The motion model may also include a longitudinal direction parameter including the speed of a moving object in a longitudinal direction or the like and a lateral direction parameter including the speed of the moving object in a lateral direction or the like. When the motion model includes the longitudinal direction parameter and the lateral direction parameter as described above, the motion of a tracking-object moving object can be appropriately indicated by the motion model.

The traveling plan generation unit 17 determines the traveling plan generated when the abnormality determination unit 16 determines that there is an abnormality in accordance with the positional relationship recognized by the positional relationship recognition unit 12d. In this case, the traveling plan generation unit 17 is capable of determining the control mode for the traveling of the host vehicle V in accordance with the positional relationship between the host vehicle V and a tracking object determined to have the motion estimation abnormality.

When a moving object determined to have the motion estimation abnormality is positioned in front of the host vehicle, the traveling plan generation unit 17 generates a traveling plan for decelerating the host vehicle V and the traveling control unit 18 decelerates the host vehicle V based on the generated traveling plan. In addition, the HMI 7 provides a notification for the driver of the host vehicle V so that the driver himself or herself performs an accelerator or brake operation. As a result, a decrease in the distance between the host vehicle V and the moving object in front of the host vehicle V determined to have the motion estimation abnormality can be suppressed. In addition, as a result of the notification for the driver, the driver can recognize the occurrence of a motion estimation abnormality of the moving object in front and the driver himself or herself can take action such as a driving operation for the host vehicle V.

When a moving object determined to have the motion estimation abnormality is present at the parallel traveling position with respect to the host vehicle, the traveling plan generation unit 17 generates a traveling plan for autonomous traveling of the host vehicle V in a lane change-prohibited state and the traveling control unit 18 allows the host vehicle V to perform autonomous traveling in the lane change-prohibited state based on the generated traveling plan. In this case, the host vehicle V becoming close to the moving object determined to have the motion estimation abnormality due to lane change by the host vehicle V can be suppressed.

When the moving object determined to have the motion estimation abnormality is positioned behind the host vehicle V, the traveling plan generation unit 17 accelerates the host vehicle V in view of the moving object in front and a speed limit. As a result, a decrease in the distance between the host vehicle V and the moving object behind the host vehicle V determined to have the motion estimation abnormality can be suppressed. In addition, when another moving object is detected in front of the host vehicle V, the host vehicle V becoming excessively close to the moving object in front can be suppressed. Furthermore, the speed of the host vehicle V exceeding the speed limit can be suppressed.

Although the embodiment of the present disclosure has been described above, the present disclosure is not limited to the embodiment described above. For example, although the vehicle control device 100 allows the host vehicle V to perform autonomous traveling, the vehicle control device 100 may also perform control other than the control for the autonomous traveling insofar as the control is to control the traveling of the host vehicle V. For example, the vehicle control device 100 may also be a device controlling the speed of the host vehicle V such that the host vehicle V follows a vehicle in front while traveling. When it is determined that the estimation of a motion of the vehicle in front or the like has an abnormality in this case, the vehicle control device 100 controls the traveling of the host vehicle V in a control mode differing from that at a time when it is determined that there is no abnormality, examples of which include deceleration of the host vehicle V.

During moving object tracking, the obstacle detection unit 12a may perform the tracking by using a motion model used for the determination of the presence or absence of the abnormality.

During moving object type determination, the type determination unit 12b may use the position of a moving object on the map recognized by the moving object position acquisition unit 12c. For example, it is conceivable that no person walks on a highway. Accordingly, when the moving object travels on a highway, for example, the type determination unit 12b may determine the type of the moving object on the assumption that the moving object is not a person. As described above, the type determination unit 12b is capable of determining the type of a moving object in accordance with the position of the moving object.

Although the motion model is determined in accordance with each position on the map, the motion model may not be determined in accordance with each position on the map, either. The motion model may be determined in advance for each moving object type. In this case, the model selection unit 15 may select a motion model based solely on the moving object type determined by the type determination unit 12b.

The traveling plan generation unit 17 may not determine the traveling plan generated when the abnormality determination unit 16 determines that there is an abnormality in accordance with the positional relationship recognized by the positional relationship recognition unit 12d. In other words, the traveling plan generation unit 17 may generate a traveling plan without using the positional relationship between a moving object and the host vehicle V recognized by the positional relationship recognition unit 12d.

What is claimed is:

1. A device for detecting a target abnormality, comprising:
a detector that detects surrounding moving objects, wherein the detector includes at least one of a camera and a radar sensor; and
an electronic control unit (ECU) including a processor programmed to:
track a moving object based on a detection result of the detector and estimate a motion of the moving object;
determine a type of the moving object;
store a plurality of motion models determined in advance for each moving object type and indicating the motion of the moving object;
select a motion model corresponding to the moving object type among the plurality of motion models; and
determine a presence or absence of an abnormality of the estimation of the motion of the moving object by comparing the motion of the moving object and the motion indicated by the selected motion model to each other for a predetermined time, wherein the predetermined time is determined based on a speed of the moving object, wherein the predetermined time is set longer as the speed of the moving object becomes faster.

* * * * *